United States Patent
Oren et al.

(10) Patent No.: US 7,222,303 B2
(45) Date of Patent: May 22, 2007

(54) SYSTEM AND METHOD FOR THE DYNAMIC IMPROVEMENT OF INTERNET BROWSER NAVIGABILITY

(75) Inventors: Dobronsky Oren, New York, NY (US); Gabriella Karni, New York, NY (US)

(73) Assignee: Hotbar.com, Inc., New York, NY (US)

( * ) Notice: Subject to any disclaimer, the term of this patent is extended or adjusted under 35 U.S.C. 154(b) by 369 days.

(21) Appl. No.: 09/864,551

(22) Filed: May 23, 2001

(65) Prior Publication Data

US 2002/0057299 A1 May 16, 2002

Related U.S. Application Data

(63) Continuation-in-part of application No. 09/373,815, filed on Aug. 13, 1999, now Pat. No. 6,784,900.

(30) Foreign Application Priority Data

Jul. 15, 1999 (IL) .................................. 130972

(51) Int. Cl.
G06F 3/00 (2006.01)
(52) U.S. Cl. .................................... 715/744
(58) Field of Classification Search ................ 345/825, 345/744–747, 749, 760, 779, 810, 835, 840
See application file for complete search history.

(56) References Cited

U.S. PATENT DOCUMENTS

| | | | |
|---|---|---|---|
| 5,786,815 A | 7/1998 | Ford | |
| 5,793,693 A | 8/1998 | Collins et al. | |
| 5,796,393 A | 8/1998 | MacNaughton et al. | |
| 5,818,446 A | 10/1998 | Bertram et al. | |
| 5,818,447 A | 10/1998 | Wolf et al. | |
| 5,850,548 A | 12/1998 | Williams | |
| 5,875,296 A | 2/1999 | Shi et al. | |
| 5,880,731 A | 3/1999 | Liles et al. | |
| 5,901,313 A | 5/1999 | Wolf et al. | |
| 5,923,885 A | 7/1999 | Johnson et al. | |
| 5,932,885 A | 8/1999 | DeBellis et al. | |
| 5,964,836 A | 10/1999 | Rowe et al. | |
| 5,986,654 A | 11/1999 | Alexander et al. | |
| 5,999,179 A | 12/1999 | Kekic et al. | |

(Continued)

FOREIGN PATENT DOCUMENTS

KR WO 01/97121 A1 * 12/2001

(Continued)

OTHER PUBLICATIONS

Winamp Skins (Sep. 26, 1998).*

(Continued)

*Primary Examiner*—Kristine Kincaid
*Assistant Examiner*—Thanh Vu

(57) ABSTRACT

A method and system for dynamically providing the on-demand addition of graphic and other information to a web brower's toolbar. The HotbarToolbar comprises a plurality of categorized or rated links, which in the presently preferred embodiment are organized under customized, newly and dynamically added toolbar buttons known as hotbuttons. The name and/or content of the hotbuttons may change dynamically in accordance with various factors (including, but not limited to, changes in URL).

31 Claims, 7 Drawing Sheets

U.S. PATENT DOCUMENTS

| | | | |
|---|---|---|---|
| 5,999,973 | A | 12/1999 | Glitho et al. |
| 6,028,997 | A | 2/2000 | Leymann et al. |
| 6,034,681 | A | 3/2000 | Miller et al. |
| 6,041,360 | A | 3/2000 | Himmel et al. |
| 6,054,987 | A | 4/2000 | Richardson |
| 6,059,842 | A | 5/2000 | Dumarot et al. |
| 6,064,383 | A | 5/2000 | Skelly |
| 6,091,411 | A | 7/2000 | Straub et al. |
| 6,104,397 | A | 8/2000 | Ryan et al. |
| 6,121,967 | A | 9/2000 | Foster et al. |
| 6,133,915 | A * | 10/2000 | Arcuri et al. ............... 345/779 |
| 6,141,010 | A | 10/2000 | Hoyle |
| 6,148,346 | A | 11/2000 | Hanson |
| 6,175,363 | B1 | 1/2001 | Williams et al. |
| 6,188,403 | B1 | 2/2001 | Sacerdoti et al. |
| 6,195,681 | B1 | 2/2001 | Appleman et al. |
| 6,195,691 | B1 | 2/2001 | Brown |
| 6,208,336 | B1 | 3/2001 | Carter |
| 6,232,972 | B1 * | 5/2001 | Arcuri et al. ............... 345/815 |
| 6,266,058 | B1 | 7/2001 | Meyer |
| 6,288,753 | B1 * | 9/2001 | DeNicola et al. ........... 348/586 |
| 6,292,185 | B1 * | 9/2001 | Ko et al. .................... 345/763 |
| 6,295,058 | B1 | 9/2001 | Hsu et al. |
| 6,297,819 | B1 * | 10/2001 | Furst ......................... 715/733 |
| 6,405,225 | B1 | 6/2002 | Apfel et al. |
| 6,496,203 | B1 * | 12/2002 | Beaumont et al. .......... 715/762 |
| 6,522,333 | B1 | 2/2003 | Hatlelid et al. |
| 6,571,290 | B2 | 5/2003 | Selgas et al. |
| 6,651,087 | B1 | 11/2003 | Dennis |
| 6,747,970 | B1 | 6/2004 | Lamb et al. |
| 6,771,290 | B1 * | 8/2004 | Hoyle ......................... 715/745 |
| 6,819,343 | B1 * | 11/2004 | Sobeski et al. ............. 715/848 |
| 6,931,254 | B1 * | 8/2005 | Egner et al. ............. 455/456.3 |
| 2001/0029527 | A1 * | 10/2001 | Goshen ....................... 709/218 |
| 2002/0140732 | A1 | 10/2002 | Tveskov |
| 2002/0149611 | A1 | 10/2002 | May |
| 2003/0107593 | A1 | 6/2003 | Domenico |
| 2003/0110450 | A1 | 6/2003 | Sakai |
| 2003/0208543 | A1 | 11/2003 | Enete et al. |
| 2003/0225846 | A1 | 12/2003 | Heikes et al. |
| 2004/0003097 | A1 | 1/2004 | Willis et al. |
| 2004/0041836 | A1 | 3/2004 | Zaner et al. |
| 2004/0215721 | A1 | 10/2004 | Szeto et al. |
| 2004/0221224 | A1 | 11/2004 | Blattner et al. |
| 2004/0268263 | A1 | 12/2004 | Van Dok et al. |

FOREIGN PATENT DOCUMENTS

| | | | |
|---|---|---|---|
| KR | WO 02/32032 | * | 4/2002 |
| WO | WO-98/47080 | | 10/1998 |
| WO | WO 00/25239 | * | 5/2000 |
| WO | WO 02/08852 A2 | | 1/2002 |

OTHER PUBLICATIONS

"Let Yahoo! Companion Be Your Guide; Users Can Now Customize Browser Toolbar to Feature Yahoo! Bookmarks and Services", *Business Wire*, (Jun. 29, 1999), 2 pp.

"Yahoo! Companion", http://docs.companion.yahoo.com/companion/learnmore_s_companion.html, (May 14, 2001), 6 pp.

Cluts, Nancy W., "The Rebar Control: Using a Coolbar in Your Application", *Microsoft Corporation*, (Oct. 1, 1996), 10 pp.

Esposito, Dino , "Browser Helper Objects: The Browser the Way You Want It", *Microsoft Corporation*, (Jan. 1, 1999), 10 pp.

Gulesian, Marcia , "Plugging Into the Web", *DBMS*, (Dec. 1, 1996),6.

Keller, Richard M., et al., "A Bookmarking Service for Organizing and Sharing URLs", *Elsevier Science B.V.*, (May 14, 1998), 2 pp.

Roberts, Scott , "Take Total Control of Internet Explorer with Advanced Hosting Interfaces", *MSDN*, (Oct. 1, 1998), 8 pp.

Smith, Douglas , "WindowBlinds Preview 0.40; Change Desktops as Easily as You Change Clothes", *WinPlanet*, (Feb. 8, 2002), 2 pp.

Smith, Douglas , "WindowBlinds Preview 0.40; What Are These WindowBlind Things Anyway?", *WinPlanet*, (Feb. 8, 2002), 2 pp.

@Mail Changelog—Description on new changes to @Mail, @Mail Webmail System, 16 pages, http://support.atmail.com/v3changelog.html, [last accessed May 2, 2005].

Cnet Download.com, Plug-ins, © 2005 CNET Networks Inc., 4 pages.

Keizer, Gregg, "Put a Little Yahoo in Your Browser—Plug-in puts Yahoo content on your browser's toolbar," Feb. 8, 2001, PCWorld.com, Web Services, 1 page, http://www.pcworld.com/resource/printable/article/0,aid,15179,00.asp [last accessed Sep. 9, 2004].

NeoPlanet Home Page, © 1998-2004 NeoPlanet, Inc., 1 page, http://www.neoplanet.com [last accessed Dec. 27, 2006].

WindowBlinds 0.95 Preview, ActiveWindows, 2 pages, wysiwyg://154/http://www.activewin.com/reviews/wb/95pre/wb95.shtml, [last accessed Feb. 8, 2002].

Yahoo! Companion, Plug-ins, 2 pages, http://www.32bit.com/software/listings/Internet/Plugin/_S/10416/, [last accessed May 14, 2001].

Alexa Homepage and Associated Webpages. http://www.archive.org. Available Dec. 2000 or earlier. Printed Dec. 2006. 23 pages.

Leebow's Friday Letter (http://scout118.cs.wisc.edu/net-news/Jun. 4, 1999/0010.html).

Stardock Press Release (Stardock Announces Window-Blinds, version 0.80, Mar. 24, 1999).

Adam Wisniewski, What, me worry? Despite hard financial times, Web innovations could still be found at Internet World 2000; TimeOut Technology, Nov. 9-16, 2000 Issue No. 268; 1-2 pages.

Chris Gonsalves, Hardware news, software updates & services briefs, ZDNet eWEEK Building The E-Business Enterprise, Nov. 13, 2000, 1 thru 4 pges.

* cited by examiner

SYSTEM AND METHOD FOR THE DYNAMIC IMPROVEMENT OF INTERNET BROWSER NAVIGABILITY

CROSS-REFERENCE TO RELATED APPLICATIONS

This application is a continuation-in-part of Ser. No. 09/373,815, filed 13 Aug. 1999, titled "SYSTEM AND METHOD FOR THE DYNAMIC IMPROVEMENT OF INTERNET BROWSER APPEARANCE AND CONNECTIVITY", now U.S. Pat. No. 6,784,900, which is commonly assigned with the present invention, and the contents of which are hereby incorporated by reference. A claim is hereby made to the earliest effective priority date to which this application is entitled.

FIELD OF THE INVENTION

The invention relates to a method for dynamically improving the appearance and performance of Internet browsers, and their connectivity to web sites.

BACKGROUND OF THE INVENTION

In the parent application mentioned above, there is disclosed an invention claiming a method and system by which the Internet Browser, and its standard "toolbar" in particular, is modified in appearance and function through the addition to the standard browser toolbar a custom HotbarToolbar, which may comprise custom "skins" and/or certain custom HotbarToolbar Buttons (hereinafter sometimes referred to as "hotbuttons"); each hotbutton had a name or label, and the depression (clicking) of which caused a pop-up menu of selected website links to appear. In the previous application (the entire contents of which are hereby incorporated by reference), i.e., prior to the method and system according to the current invention, these hotbuttons, once "attached" to the HotbarToolbar, remained there, fixed and static in nature, with their identifying name or label remaining whatever it was chosen to be upon the creation and attachment of the button. Notably, the hotbuttons were essentially "static", in that they did not change when the browser navigated from one website to another.

SUMMARY OF THE INVENTION

The HotbarToolbar comprises a plurality of categorized or related links, which in the presently preferred embodiment are organized under customized, newly and dynamically added toolbar buttons known as hotbuttons. The name and/or content of the hotbuttons may change dynamically in accordance with various factors (including, but not limited to, changes in URL).

DETAILED DESCRIPTION OF PRESENTLY PREFERRED EMBODIMENTS

In accordance with the method and system of the present invention, there are provided means for dynamically selecting one or more customized hotbuttons for incorporation into the HotbarToolbar, the selection of such will change during the use of the browser (as when one navigates from one site to another) and the choice of which may be made according to one or more of a variety of factors. Said means may, for example, be provided in the form of the client computer sending information which information may include, for example, its current location URL to the server, and receiving therefrom a list of the appropriate hotbuttons to be displayed on the Hotbar Toolbar. The appearance and/or the contents (e.g. links) of a hotbutton might change as a function of one or more factors, such as, for example: the subject of the current web page that the browser is viewing, the skin that is wrapped around the toolbar, the context and/or content of the current web page (including, but not limited to, products displayed on the current web page), desired advertisement, demographic information, geographic information, the behavior of the user, the interests of the user, as well as for other reasons which will be readily apparent to those of ordinary skill in the relevant art.

Reference is now made to FIG. 10, which shows a customized browser comprising the method and system according to the present invention. Note in FIG. 10 that the browser is shown located at the website www.yahoo.com—a site of general interest. Note in FIG. 10 that, in accordance with the present invention, certain hotbuttons were chosen for incorporation into the HotbarToolbar; these hotbuttons are labeled "Directories", "Search Engines", "Shopping", "Chat", "Freebies" and "Communities". Note further the custom skin; in addition to all its other functions and purposes, its presence is a signal to the surfer that he or she is using a modified (enhanced) browser, and hence the custom skin works cooperatively and synergistically with the other elements of the method and system of the current invention, especially inasmuch as it alerts a user to the presence of the custom hotbuttons.

It is useful to next consider how the selection of hotbuttons changes when the browser is directed to another site. As is well known to those of ordinary skill in the art, entering a new URL, whether manually, via hyperlink, or otherwise will redirect the browser to that new URL. For example, if one enters http://games.yahoo.com into the address window, he or she will be redirected to that page, as depicted in FIG. 11. In accordance with traditional browser operation, browsing to the new address: http://games.yahoo.com, has resulted in the display of new content, i.e., the content of the web page located at that site—in this instance, content relating to games. Also, in accordance with the method and system of the present invention, browsing to the new address http://games.yahoo.com has resulted in the incorporation of new hotbuttons related to said address (e.g. URL, content, etc.).

To better understand and appreciate the method and system according to the present invention, look more closely at FIG. 11 and compare it to FIG. 10. Note that the labels on the hotbuttons have changed from what they were in FIG. 10. Specifically, the hotbuttons labeled "Directories", "Search Engines", "Shopping", "Chat", "Freebies" and "Communities" which had been displayed in the browser located at www.yahoo.com (see FIG. 10), have changed to different hotbuttons, labeled "Games", "Video Games", "Gambling", "Play Station", "Board Games" and "Toys" which are displayed in the browser located at http://games.yahoo.com (see FIG. 11).

Thus, it is readily seen that, in accordance with the method and system according to the present invention, the customized hotbuttons are not static, but dynamic, and change during the operation of the browser according to factors previously discussed. Clicking on a hotbutton may result in various actions; in this example, it yields a list of links related to that hotbutton label (topic). In the instance where one or more hotbuttons are related to a specific product(s) displayed within the web page, the list of links yielded when clicking the hotbutton may also include comparative shopping information related to such product(s).

Note that the hotbuttons displayed on the HotbarToolbar are actually related to the topics, content (including, but not limited to, products) and/or appearance of what is displayed on the screen. This is an important aspect of the present invention. It should be understood that any one or more of a variety of techniques could be used to dynamically select the hotbuttons displayed on the HotbarToolbar at any time. For example, the customized browser constituted and operated in accordance with the present invention might associate the URL to a pre-cataloged directory which defined related hotbutton topics; alternatively, or additionally, the present invention may analyze the content of the page displayed, and, upon finding certain keywords, identify hotbuttons relevant to those keywords; alternatively, or additionally, the customized browser might analyze the IP address underlying the URL to which the customized browser has been directed, and infer therefrom certain demographic information and/or geographic information and/or other information which it might use in assigning the relevant topics to the hotbuttons.

Consider next what happens when a surfer clicks on a hotbutton in this example, e.g. the hotbutton in FIG. 12 that is labeled "PlayStation". FIG. 12 shows the result of such a click—the emergence of a pop-up window (hereinafter sometimes referred to as a "Center") comprising links relating to the title, or topic of that hotbutton.

Figure 10:
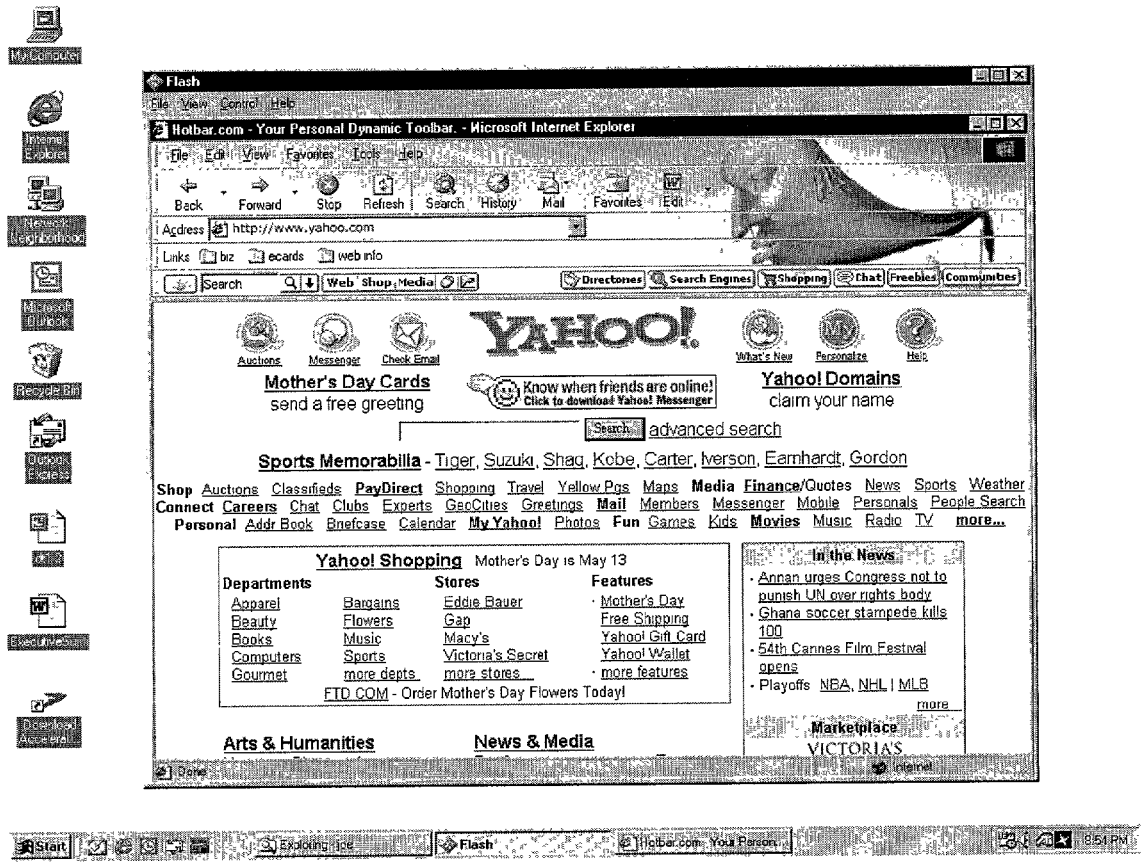
FIG. 10 is a screenshot of a customized browser comprising the method and system according to the present invention, showing the browser's appearance at www.yahoo.com.
Figure 11:
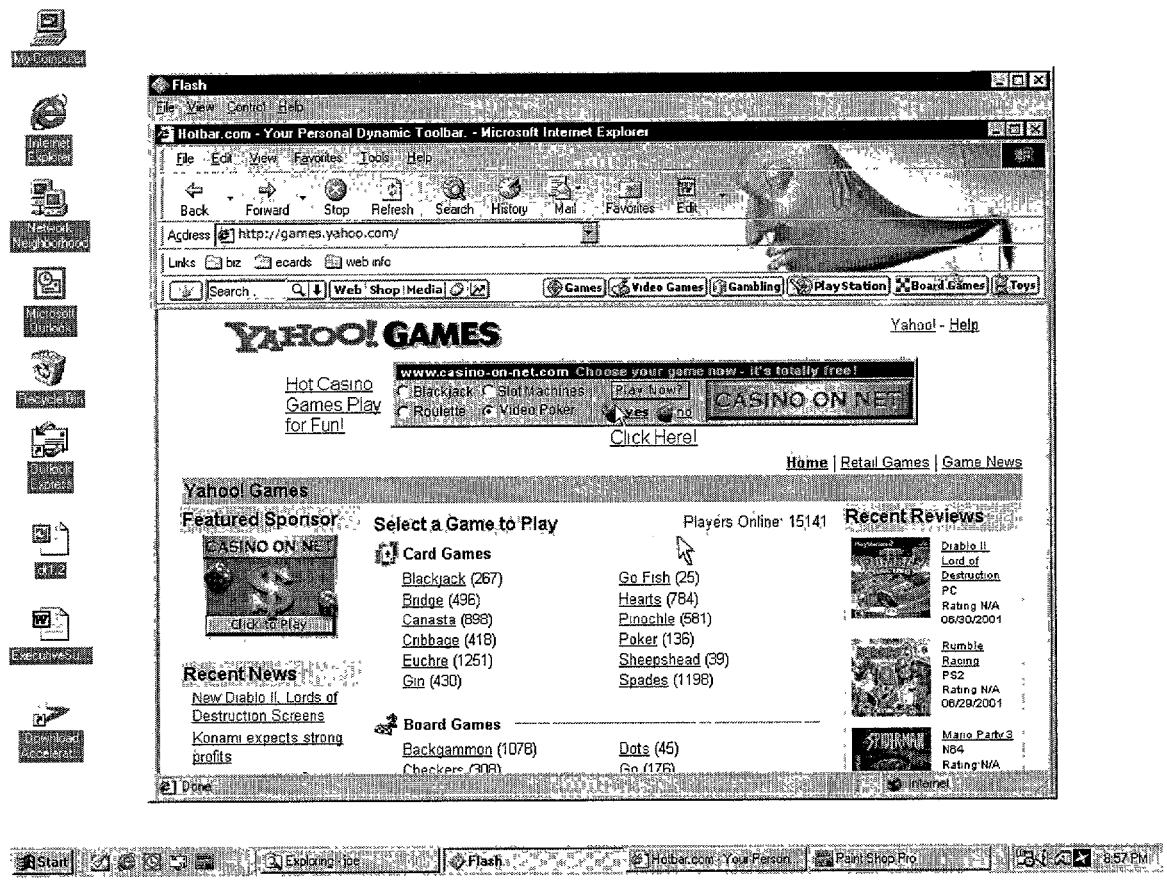
FIG. 11 is a screenshot of a customized browser comprising the method and system according to the present invention, showing the browser's appearance at http://games.yahoo.com with the new hotbuttons.
Figure 12:
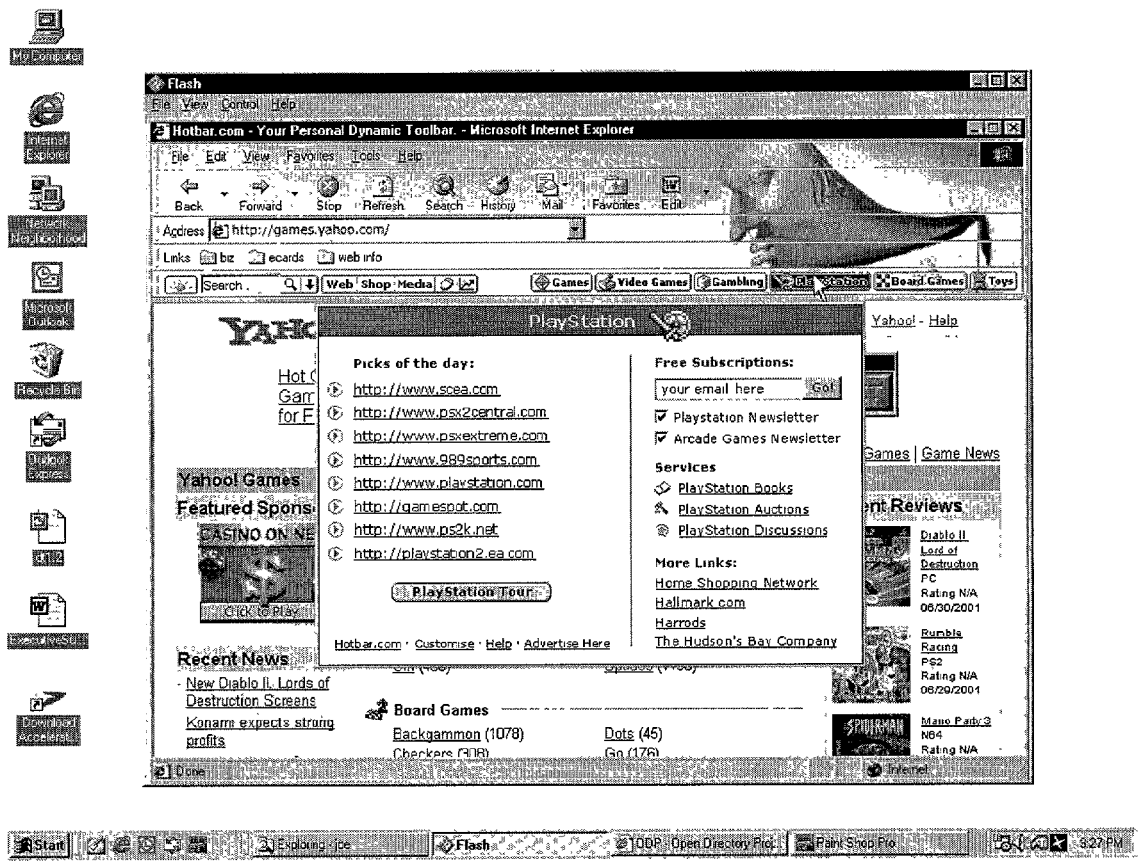
FIG. 12 is a screenshot of a customized browser comprising the method and system according to the present invention, showing the browser's appearance at http://games.yahoo.com after the user has clicked on the Playstation hotbutton as illustrated therein.
Figure 13:
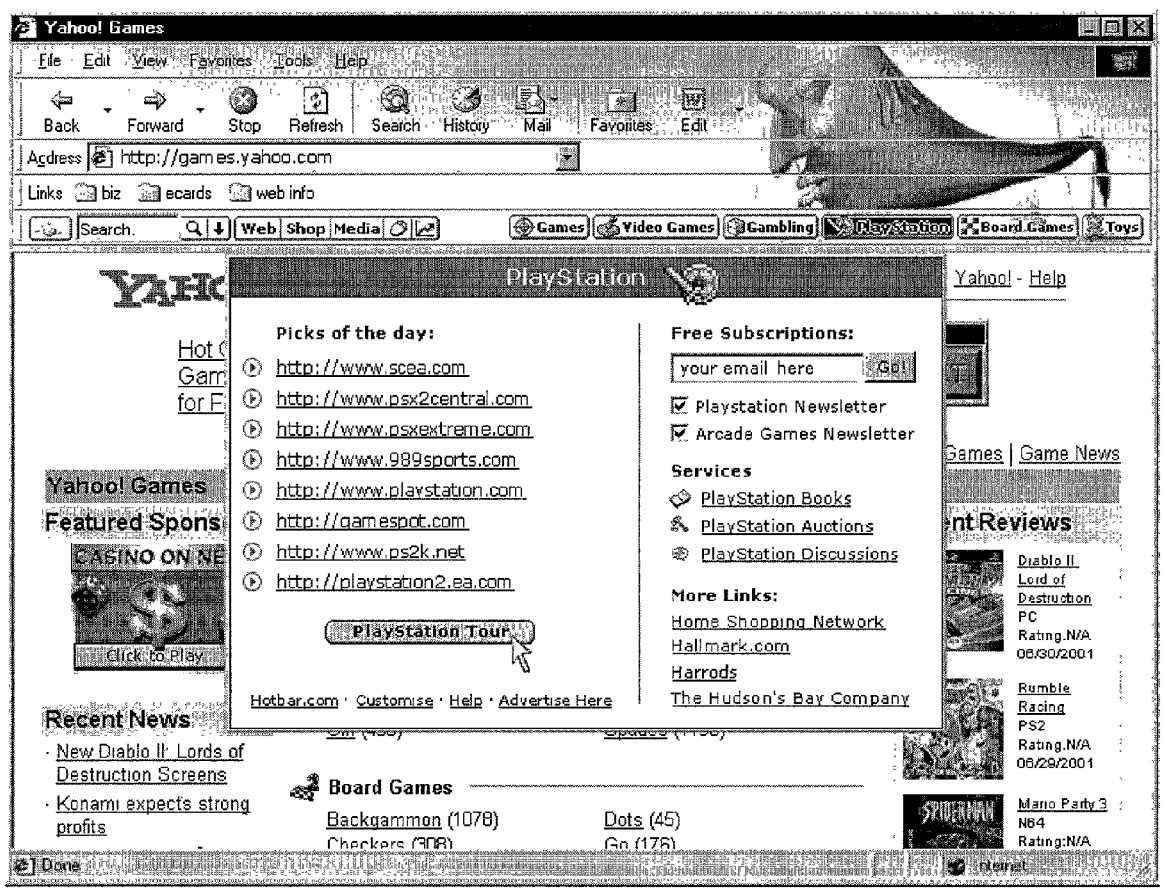
FIG. 13 is a screenshot of a customized browser comprising the method and system according to the present invention, showing that the user can click on the "Playstation Tours" button within the Playstation hotbutton pop-up.
Figure 14:
FIG. 14 is a screenshot of a customized browser comprising the method and system according to the present invention, showing that the tour will open in a frame at the bottom border of the screen and the user can step through the "picks of the day" (list of related links which are shown in the Playstation hotbutton pop-up as displayed in FIG. 12) by clicking on the 'Last Site' and 'Next Site' buttons
Figure 15:
FIG. 15 is a screenshot of a customized browser comprising the method and system according to the present invention, showing that the user is redirected to the next site in the list and can close the Tour by clicking on the X in the top-left corner of the Tour frame.
Figure 16:
FIG. 16 is a screenshot of a customized browser comprising the method and system according to the present invention, showing that the Tour frame has been closed.

While embodiments of the invention have been described by way of illustration, it will be understood that the invention can be carried out by persons of ordinary skill in the art with many modifications, variations and adaptations, without departing from the scope of the claims and the legally permissible equivalents thereof.

We claim:

1. A method for presenting graphic and other information in a toolbar area of a browser, the method comprising:
   providing a plug-in for installation in a browser, the plug-in stored on a computer-readable medium comprising programming instructions for:
   displaying a user-selectable button in the toolbar area of the browser;
   wherein the user-selectable button includes at least one of graphic information and a text label, the user-selectable button for directing a user to at least one web site corresponding to the text label; and
   updating the graphic information and the text label dynamically based on a web site that is being accessed via the browser.

2. The method of claim 1, the graphic information including text information.

3. The method of claim 1, the graphic information corresponding to content of the web site that is being accessed by the browser.

4. The method of claim 1, wherein a selection of the button results in a presentation of links to at least one web site related to the text label.

5. The method of claim 1, wherein a selection of the button results in the browser being directed to a web site having content related to the text label of the button.

6. The method of claim 1, the graphic information including an advertisement.

7. The method of claim 1, further comprising:
   updating the text label based on an additional factor, other than the web site being accessed via the browser.

8. The method of claim 7, the additional factor comprising an attribute of a user of the browser.

9. The method of claim 1, said updating further comprising updating an appearance of the button based on the web site being accessed by the browser.

10. A method for dynamically updating an attribute of a browser via a plug-in, the method comprising:
    providing graphic information in a toolbar area of a browser; and
    updating the graphic information dynamically based on a web site that is being accessed via the browser.

11. The method of claim 10, the graphic information further comprising a user-selectable button that includes a text label, the button for directing a user to at least one web site corresponding to the text label.

12. The method of claim 11, wherein the text label is updated based on the web site that is being accessed via the browser.

13. The method of claim 10, the graphic information including text information.

14. The method of claim 10, the graphic information corresponding to content of the web site that is being accessed by the browser.

15. The method of claim 10, further comprising:
    updating the text label based on an additional factor, other than the web site being accessed via the browser.

16. A system for providing on-demand addition of graphic and other information to a toolbar area of a browser, the system comprising:
    a processor; and
    a memory in communication with the processor and arranged for storing a plug-in for a web browser, the plug-in containing processing instructions that, when executed, direct the processor to display a user-selectable button in the toolbar area of the web browser, and to update the displayed user-selectable button dynamically based on a web site that is being accessed via the browser, wherein the user-selectable button includes at least one of a text label and the graphic information.

17. A system for presenting graphic and other information in a toolbar area of a browser, the system comprising:
 a plug-in for installation in a browser, the plug-in stored on a computer-readable medium comprising:
 means for displaying a user-selectable button in the toolbar area of the browser;
 wherein the user-selectable button includes at least on of graphic information and a text label, the user-selectable button for directing a user to at least one web site corresponding to the text label; and
 means for updating the graphic information and the text label dynamically based on a web site that is being accessed via the browser.

18. The system of claim 17, the graphic information including text information.

19. The system of claim 17, the graphic information corresponding to content of the web site that is being accessed by the browser.

20. The system of claim 17, wherein a selection of the button results in a presentation of links to at least one web site related to the text label.

21. The system of claim 17, wherein a selection of the button results in the browser being directed to a web site having content related to the text label of the button.

22. The system of claim 17, the graphic information including an advertisement.

23. The system of claim 17, further comprising:
 means for updating the text label based on an additional factor, other than the web site being accessed via the browser.

24. The system of claim 23, the additional factor comprising an attribute of a user of the browser.

25. The system of claim 17, the updating further comprising means for updating an appearance of the button based on the web site being accessed by the browser.

26. A system for dynamically updating an attribute of a browser via a plug-in, the system comprising:
 means for providing graphic information in a toolbar area of a browser; and
 means for updating the graphic information dynamically based on a web site that is being accessed via the browser.

27. The system of claim 26, the graphic information further comprising a user-selectable button that includes a text label, the button for directing a user to at least one web site corresponding to the text label.

28. The system of claim 26, wherein the text label is updated based on the web site that is being accessed via the browser.

29. The system of claim 26, the graphic information including text information.

30. The system of claim 26, the graphic information corresponding to content of the web site that is being accessed by the browser.

31. The system of claim 26, further comprising:
 means for updating the text label based on an additional factor, other than the web site being accessed via the browser.

* * * * *